Jan. 29, 1957 J. R. GOMERSALL 2,779,849
GLASS TUBE HEATING ELEMENTS FOR TOASTERS
Filed Sept. 14, 1953 2 Sheets-Sheet 1
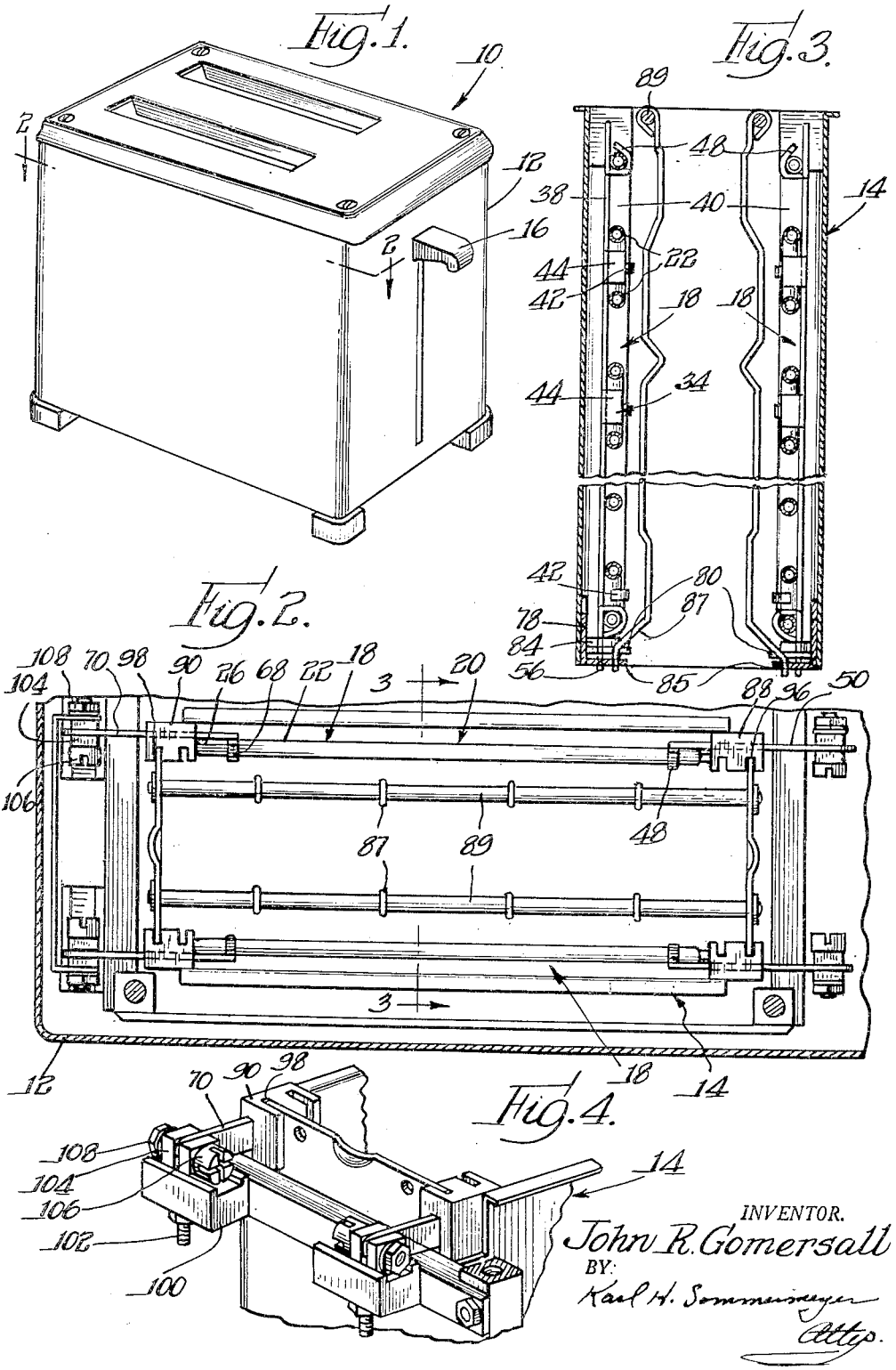
INVENTOR.
John R. Gomersall
BY
Karl H. Sommermeyer
Attys.

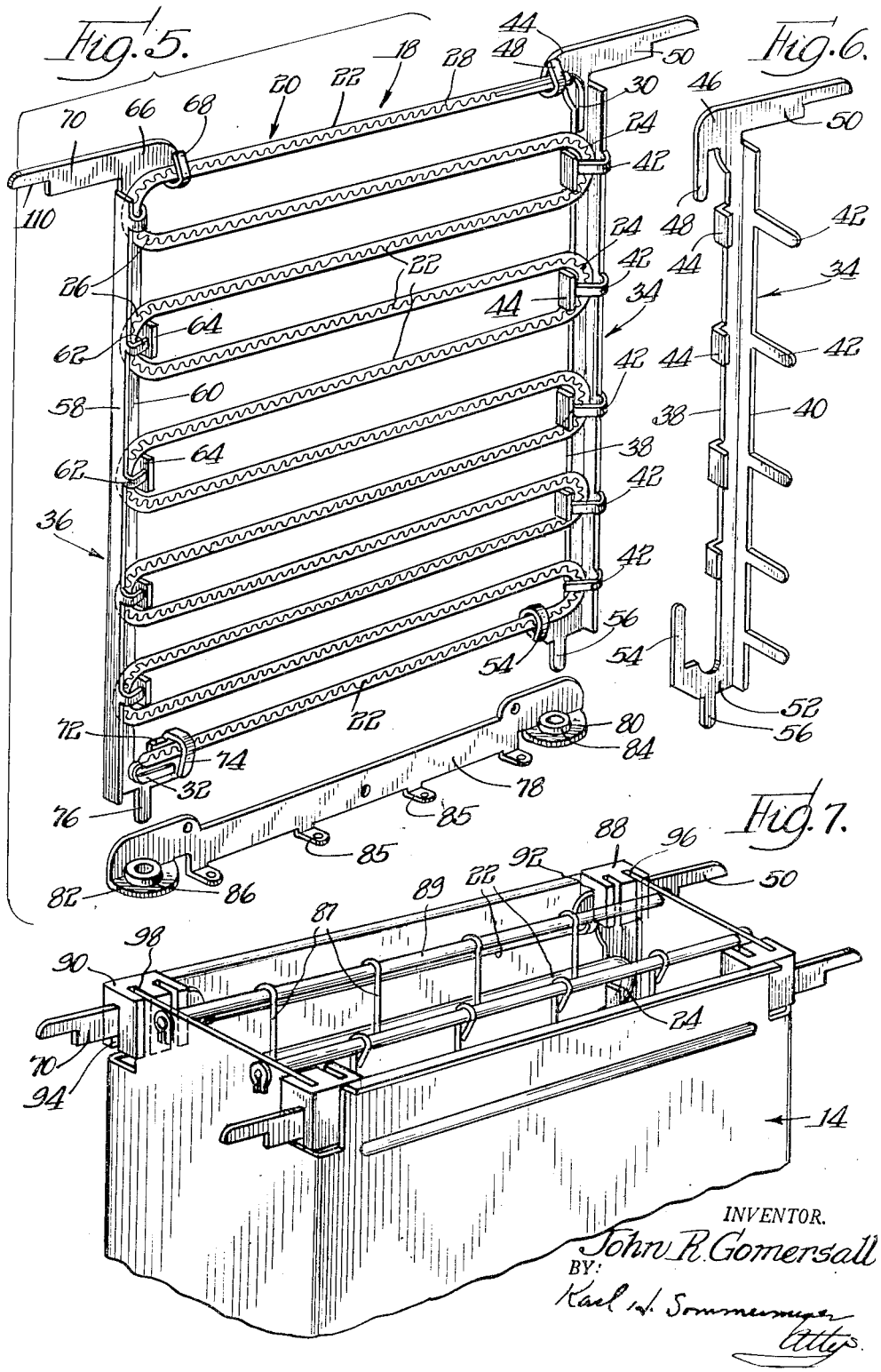

United States Patent Office 2,779,849
Patented Jan. 29, 1957

2,779,849

GLASS TUBE HEATING ELEMENTS FOR TOASTERS

John R. Gomersall, Elgin, Ill., assignor to McGraw Electric Company, Elgin, Ill., a corporation of Delaware Application September 14, 1953, Serial No. 379,757

9 Claims. (Cl. 219—19)

The present invention relates to a novel heating unit, and more particularly to a novel electrical heating unit especially adapted for use in toasters and the like.

In the past, heating units for toasters and like appliances have often been made by winding an electric resistance element about a mica card. This structure is not entirely satisfactory since the mica cards are relatively expensive and since the heating element is exposed to the atmosphere so that the element usually must be operated at a reduced temperature. It has been proposed to overcome these disadvantages by enclosing the resistance element within a glass tube. However, as is understood, glass is relatively fragile, and suitable means must be provided for supporting the glass tube to obtain a sufficiently rugged heating unit. Furthermore, it is desirable in many instances that the heating unit be easily replaceable in toasters and the like, especially when the toaster is to be used in a commercial establishment, in order to facilitate changes in the heating unit to suit various line voltages, and also for purposes of repair.

An object of the present invention is to provide a novel heating unit including a resistance element disposed within a glass tube, wherein relatively simple and economical means is provided for supporting the glass tube to obtain a sufficiently rugged structure.

Another object of the present invention is to provide a novel heating unit of the type set forth in the preceding paragraph, which heating unit may be relatively easily assembled in or removed from an appliance such as a toaster.

A more specific object of the present invention is to provide a novel appliance, such as a toaster, including a novel heating unit of the above described type, wherein the heating unit may be relatively easily assembled in or removed from the appliance and easily connected or disconnected from the electric circuit of the appliance.

Other objects and advantages of the present invention will become apparent from the following description and the drawings, wherein:

Fig. 1 is a perspective view of a toaster embodying the features of this invention;

Fig. 2 is an enlarged fragmentary horizontal cross sectional view taken along line 2—2 in Fig. 1;

Fig. 3 is a fragmentary vertical cross sectional view taken along line 3—3 in Fig. 2;

Fig. 4 is an enlarged fragmentary perspective view illustrating the manner in which the novel heating unit of this invention may be connected to the electric circuit of the toaster;

Fig. 5 is an exploded perspective view showing the novel heating unit of this invetnion and a portion of the mounting means therefor;

Fig. 6 is a perspective view showing one of the glass tube support members of the novel heating unit of this invention; and Fig. 7 is a fragmentary perspective view showing in part the manner in which the heating units of this invention are supported in the toaster.

Referring now more specifically to the drawings, wherein like parts are designated by the same numerals throughout the various figures, a toaster 10 embodying the novel features of this invention is shown in Fig. 1. While this invention will be described with particular reference to its utility in toasters, it will be understood from the following disclosure that certain features might well be used in appliances other than toasters.

In the particular structure shown in the drawings for the purpose of illustrating the invention, the toaster includes a housing 12 having one or more ovens 14 therein. Any conventional means manually controlled by a handle 16 and automatically controlled by suitable timing mechanism may be provided for raising and lowering a slice of bread and the like in the toaster oven. As shown in Figs. 2, 3, 4, and 7, the oven 14 may be a rectangular frame member preferably formed of sheet metal, and it may be supported within the toaster housing by any suitable means.

In accordance with the present invention, a novel heating unit 18 is provided which is adapted to be removably supported within the toaster oven. This heating unit is shown best in Fig. 5 and includes a convolute tube 20 of glass or similar material having a plurality of transversely extending sections or runs 22 joined together at opposite ends by curved or U-bent sections 24 and 26. As shown in the drawings, the glass tube is formed to provide a figure of generally rectangular shape with all sections of the tube being disposed substantially in a common plane. An electric resistance heating element 28 is threaded through the entire tube and is provided with terminal end sections 30 and 32 extending beyond opposite ends of the tube.

In order to support the glass tube and substantially reduce any possibility of breakage, a pair of members 34 and 36 are provided for retaining the curved sections of the tube within a common plane while permitting limited flexing movement of the tube sections within the plane. Since both of the support members 34 and 36 are substantially identical, only the member 34 will be described in detail. As shown in Figs. 5 and 6, the support member 34 includes a pair of integral elongated sections 38 and 40 disposed to provide the support member with a generally L-shaped cross section. The section 38 is positioned along one side of the curved tube sections 24 to prevent flexing of the tube sections out of the common plane in one direction, and a plurality of finger-like elements 42 extend from the support member section 40 and overlie the curved tube sections to prevent flexing in an opposite direction. When the support member is assembled with the glass tube, the finger members 42 are bent from the position shown in Fig. 6 to the position shown in Fig. 5 so that they extend within the curved portions 24 of the glass tube and between the tube sections 22. Furthermore, the fingers 42 loosely enclose the curved tube sections to permit flexing of the parts and also expansion and contraction of the metal support relative to the glass tube. This prevents breakage of the glass tube when expanded and contracted under varying temperature conditions of the heating unit and when the unit is subjected to shocks. In order to limit flexing movement of the curved tube sections 24 toward and away from each other, a plurality of tabs 44 extend from the support section 38 and between the legs of the curved or U-bend tube sections, as illustrated in Fig. 5. These tabs are constructed so that they have a width which is less than the distance between the legs of the U-bend tube sections, whereby to permit limited flexing movement. It should be noted that the finger elements 42 are formed so as to limit relative movement between the support member and the curved tube sections so that the tabs 44 will be prevented from contacting at any one time both converging legs of the U-bend tube sections, whereby the tube sections are always free for limited flexing movement.

As shown best in Figs. 5 and 6, the upper end of the support member section 38 is provided with an enlargement 46 which is positioned along one side of the uppermost glass tube section 22. The free end of this uppermost tube section 22 is loosely retained against the enlargement 46 by a finger-like element 48. In accordance with a feature of this invention, the support member 34 is constructed of sheet metal and provides a terminal for the heating unit. Therefore, the end 30 of the electric resistance element is secured directly to the support member by any suitable means such as spot welding. Preferably, the free end of the uppermost transverse tube section 22 terminates short of the edge of the support member portion 38 to permit the end 30 of the resistance element to be conveniently bent downwardly and secured to the portion 38 in the manner illustrated. The upper end of the support member 34 is also provided with an outwardly extending projection 50 which is adapted to be connected with the electrical circuit of the toaster or other appliance in the manner described below.

The lower end of the support member 34 is also provided with an enlargement 52 adapted to be disposed along the lowermost transverse tube section 22 and a finger-like element 54 loosely enclosing the lowermost tube section. A finger 56 extends downwardly from the enlargement 52 for cooperation with an insulating mounting member in the manner described below.

As stated above, the support member 36 is substantially identical to the support member 34. Thus, the member 36 is formed from sheet metal and includes angularly disposed portions 58 and 60 having a plurality of tube retaining finger-like elements 62 and tabs 64 extending therefrom. The upper end of the member 36 also includes an enlargement 66 having a finger-like element 68 loosely surrounding the uppermost tube section and a projection 70 for connection with an electrical terminal. The lower end of the member 36 is likewise provided with an enlargement 72 having a finger-like element 74 loosely surrounding the lowermost transverse tube section. The support member 36 also acts as an electrical terminal for the heating unit, and thus the end 32 of the resistance element is connected directly to the support member 36 in any suitable manner, and a finger 76 projects downwardly for cooperation with an insulating mounting member.

When utilizing the novel heating unit 18 of this invention in the toaster 10, a pair of the heating units are preferably disposed along opposite sides of the oven 14 in the manner illustrated best in Figs. 2, 3, and 7. Means is provided for removably mounting the heating units within the oven so as to permit the units to be relatively easily replaced, and, in addition, since the support members 34 and 36 act as electrical terminals, this mounting means also electrically insulates the heating unit from the remainder of the toaster. As shown best in Figs. 3 and 5, the heating unit mounting means may include a bracket member 78 which is secured to one wall of the oven by any suitable means, such as rivets. At opposite ends, the bracket member is provided with tabs 80 and 82 which, respectively, support bushings 84 and 86. The bushings are preferably constructed of an electrical insulating ceramic material and are provided with suitable apertures for receiving the fingers 56 and 76 on the heating unit support members, whereby the lower end of the heating unit is mounted in the oven and insulated from the oven. The bracket 78 may also include fingers 85 for securing lower ends of wire guides 87 which have guides for their upper ends secured to transversely extending rods 89, as shown best in Figs. 2 and 3.

The upper end of the heating unit is mounted in and insulated from the oven by the means shown best in Figs. 4 and 7. This means includes a pair of block-like members 88 and 90 formed of suitable insulating material. The block-like member 88 is provided with a slot 92 adapted to receive the upper end of the support member 34, and the member 90 is provided with a similar slot 94 for receiving the upper end of the support member 36. As shown in Figs. 4 and 7, the upper corners of the oven 14 are cut away to permit entry of the insulating blocks 88 and 90, and these blocks are, respectively, provided with slots 96 and 98 for receiving an edge of the oven wall, whereby to retain the insulating blocks in proper position with the upper ends of the heating unit support members insulated from the oven. With this structure, it is seen that the heating unit may be easily assembled in or removed from the oven 14.

The appliance or toaster 10 is provided with suitable means which may be easily connected with the projections 50 and 70 of the heating unit support members to establish an electric circuit. Such means is illustrated in Figs. 2 and 4 and includes a mounting block 100 mounted in any suitable manner and carrying a terminal screw 102. The screw 102 has a split head 104 which is adapted to receive the projection 70 of the support member 36. A screw 106 extends through suitable apertures in the opposite sides of the split head 104, and a nut 108 in threaded on the screw, whereby the opposite sides of the split head may be clamped together into secure engagement with the projection 70. As shown in Fig. 5, the projection 70 is provided with a recess 110 to accommodate the screw 106, whereby the projection may be assembled with or disconnected from the split head 104 merely by loosening the screw 106 and shifting the projection either in or out between the opposite sides of the split head. It is understood, of course, that the terminal screw 102 may be suitably connected with a source of electrical current. The projection 50 on the support member 34 is detachably connected to a terminal screw similar to the screw 102, and, therefore, this structure need not be described in detail.

From the above description, it is seen that the present invention has provided a novel appliance or toaster structure having a novel heating unit which may be relatively easily assembled or disassembled with the toaster for any desired purpose. More particularly, it is seen that the present invention has provided a novel heating unit having the heating element enclosed within a glass tube, which unit includes means for not only supporting the glass tube, but also providing terminals for the heating unit. Furthermore, it is seen that the present invention has provided a novel heating unit having relatively simple and economical means for supporting the glass tube, whereby a rugged structure is obtained.

While the preferred embodiment of the present invention has been shown and described herein, it is obvious that many structural details may be changed without departing from the spirit and scope of the appended claims.

The invention is claimed as follows:

1. An electric heating unit of the type described, comprising a convolute glass tube having a plurality of spaced sections joined by curved portions disposed substantially in a common plane, an electric resistance element extending through said tube, a support member, said support member having a part thereof disposed along one side of a plurality of said curved tube portions, means extending from said support member and overlying opposite sides of said plurality of curved tube portions for retaining said curved tube portions substantially in said common plane, and means extending from said support member and between a pair of tube sections for loosely retaining said tube for limited movement within said common plane, said support member being electrically connected with one end of said resistance element and providing one terminal for the heating unit, said support member including finger-like projection means adapted to be inserted into an insulating mounting bushing for mounting heating unit, and said support member including means adapted to be connected with a source of electricity.

2. An electric heating unit of the type described, comprising a convolute glass tube having a plurality of spaced sections joined by curved portions disposed substantially in a common plane, an electric resistance element extending through said tube, a support member, said support member having a part thereof disposed along one side of a plurality of said curved tube portions, a plurality of tab members each extending between a pair of tube sections and having a width less than the distance between said pair of tube sections for loosely retaining said tube for limited movement within said common plane, each of said tab means extends between a pair of tube sections joined by one of said curved portions, and means for retaining said curved portions in said common plane including a plurality of finger-like members each extending partially around a curved tube portion for loosely retaining the curved tube portion in assembled relationship with the supporting member and for limiting movement between the curved tube portion and the supporting member so as to prevent opposite edges of said tab means from simultaneously contacting the glass tube.

3. An electric heating unit of the type described, comprising a pair of sheet material support members, a convolute glass tube having a plurality of spaced sections extending between said support members and joined by curved portions disposed substantially in a common plane, each of said support members having a part thereof disposed along one side of a plurality of said curved portions, a plurality of integral finger means extending from each of said support members and overlying opposite sides of said plurality of curved portions for retaining said curved portions substantially in the common plane, a plurality of integral tab means extending from each of said support members and between a pair of said tube sections for loosely retaining the tube for limited movement within said common plane, and an electric resistance element extending through said glass tube.

4. An electric heating unit of the type described, comprising a pair of support members, a convolute glass tube having a plurality of spaced sections extending between said support members and joined by curved portions disposed substantially in a common plane, each of said support members having a part thereof disposed along one side of a plurality of said curved portions, means extending from each of said support members and overlying opposite sides of said plurality of curved portions for retaining said curved portions substantially in the common plane, means extending from each of said support members and between a pair of said tube sections for loosely retaining the tube for limited movement within said common plane, and an electric resistance element extending through said glass tube, one of said support members including an elongated piece of sheet metal having a generally L-shaped transverse cross section, and said means for retaining the curved portions substantially in the common plane includes a plurality of deformable finger-like elements extending from said sheet metal piece and loosely partially enclosing at least one of said curved portions.

5. An electric heating unit, as defined in claim 4, wherein said means extending between a pair of said tube sections includes a tab extending from said piece of sheet material, which tab has a width less than the distance between said pair of tube sections.

6. An electric heating unit of the type described, comprising a pair of support members, a convolute glass tube having a plurality of spaced sections extending between said support members and joined by curved portions disposed substantially in a common plane, each of said support members having a part thereof disposed along one side of a plurality of said curved portions, means extending from each of said support members and overlying opposite sides of said plurality of curved portions for retaining said curved portions substantially in a common plane, means extending from each of said support members and between a pair of said tube sections for loosely retaining the tube for limited movement within said common plane, and an electric resistance element extending through said glass tube, each of said support members being formed of metal, and one of said support members being electrically connected with one end of the resistance element and the other of said support members being electrically connected with the opposite end of said resistance element, whereby said support members provide electric terminals for the heating unit.

7. In an electric appliance such as a toaster, the combination, comprising frame means, a pair of separate spaced apart metal support members disposed within said frame means, a convolute glass tube having sections extending between said support members and joined by curved portions, means connecting said glass tube to said support members for supporting the tube, an electric resistance element extending through said tube, one end of said resistance element being connected to one of said support members and the other end of said resistance element being connected with the other of said support members, mounting means for said support members, said mounting means including insulators slidably and removably receiving said support members for maintaining the support members out of contact with other portions of the appliance including said frame means, certain of said insulators including a body member having an open ended slot in a side thereof slidable endwise onto and receiving a marginal portion of said frame means and a slot in a bottom surface thereof slidably and removably receiving a support member end portion extending outwardly of said frame means, and electrical contact means adapted slidably and removably to receive each of said support members, whereby the support members and the resistance element form a continuous electric conductor, at least one of said contact means being disposed outwardly of said frame means and receiving said support member portion.

8. An appliance, as defined in claim 7, wherein at least a pair of said insulators are provided with an aperture, and wherein each of said support members includes an integral finger-like element insertable into the aperture in said pair of insulators.

9. An appliance, as defined in claim 7, wherein said means for connecting the glass tube to said support members includes a plurality of finger-like elements integral with and extending from each of said support members and loosely partially enclosing a curved portion of the tube for retaining said curved portions of the tube substantially in a common plane, and tab means integral with and extending from each of said support members and between pairs of said tube sections for retaining said tube sections for limited movement within said common plane.

References Cited in the file of this patent

UNITED STATES PATENTS

| | | |
|---|---|---|
| 1,032,267 | Bastian | July 9, 1912 |
| 1,680,768 | Dalton | Aug. 14, 1928 |
| 1,736,451 | MacInnes | Nov. 19, 1929 |
| 1,775,441 | Pipes | Sept. 9, 1930 |
| 2,012,788 | Ireland | Aug. 27, 1935 |
| 2,606,989 | Gomersall | Aug. 12, 1952 |
| 2,620,426 | Gustafson | Dec. 6, 1952 |
| 2,659,798 | Olving | Nov. 17, 1953 |